United States Patent
Fraccaroli

(10) Patent No.: US 6,748,223 B2
(45) Date of Patent: Jun. 8, 2004

(54) APPARATUS, AND ASSOCIATED METHOD, FOR PROVIDING A DIGITAL IMAGE GENERATED AT A MOBILE STATION TO AN ASSISTANCE CENTER

(75) Inventor: Federico Fraccaroli, Irving, TX (US)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 09/815,738

(22) Filed: Mar. 23, 2001

(65) Prior Publication Data
US 2002/0137528 A1 Sep. 26, 2002

(51) Int. Cl.⁷ .............. H04B 1/40; H04B 1/38; H04Q 7/20; H04M 1/00
(52) U.S. Cl. ......... 455/456; 455/74.1; 455/414; 455/556; 455/557; 379/447
(58) Field of Search ............... 455/456, 556, 455/74.1, 557, 414; 349/447

(56) References Cited

U.S. PATENT DOCUMENTS

| 5,519,760 | A | * | 5/1996 | Borkowski et al. | |
| 5,666,159 | A | | 9/1997 | Parulski et al. | 348/211 |
| 5,719,936 | A | * | 2/1998 | Hillenmayer | 379/447 |
| 5,893,037 | A | * | 4/1999 | Reele et al. | 455/556 |
| 5,966,643 | A | * | 10/1999 | Radley | 455/74.1 |
| 6,169,902 | B1 | * | 1/2001 | Kawamoto | 455/456 |
| 6,278,884 | B1 | | 8/2001 | Kim | 455/556 |
| 6,288,641 | B1 | | 9/2001 | Casais | 340/539 |
| 6,553,238 | B1 | * | 4/2003 | Ginzel et al. | 455/557 |
| 6,580,904 | B2 | * | 6/2003 | Cox et al. | 455/414 |
| 2002/0137528 | A1 | * | 9/2002 | Fraccaroli | |

FOREIGN PATENT DOCUMENTS

| WO | WO 97/41686 | 11/1997 |
| WO | WO 99/57910 | 11/1999 |
| WO | WO 01/20567 | 3/2001 |
| WO | WO 01/31925 | 5/2001 |
| WO | WO 01/93590 | 12/2001 |

* cited by examiner

Primary Examiner—William Cumming

(57) ABSTRACT

Apparatus, and an associated method, by which to provide a digital image, created at the mobile station by a digital camera forming a portion thereof, to an assistance center, such as an emergency dispatch center. The digital image is created automatically upon initiation at the mobile station of a request for assistance from the assistance center. Initiation of a 911 emergency call, for example, causes a digital image to be created by the digital camera, and signals representative of the created digital image are automatically sent to the assistance center. Once received at the assistance center, viewing of the digital images provides personnel at the assistance center with additional information by which best to respond to the request for assistance. And, the digital image is storable thereat for evidentiary purposes.

16 Claims, 3 Drawing Sheets

APPARATUS, AND ASSOCIATED METHOD, FOR PROVIDING A DIGITAL IMAGE GENERATED AT A MOBILE STATION TO AN ASSISTANCE CENTER

The present invention relates generally to a manner by which to provide an assistance center, such as an emergency dispatch center to which 911 or other assistance-request calls are routed, with data generated at a mobile station at which the call for assistance is originated. More particularly, the present invention relates to apparatus, and an associated method, by which to provide a digital image to the assistance center together with initiation at the mobile station of the assistance-request call. A single image, or a series of images, such as that produced pursuant to a multimedia service, if formed. When a digital image is provided to the assistance center, personnel at the assistance center are better able to prepare an appropriate response to the request. And, by capturing the digital image, the digital image can be utilized for evidentiary purposes.

BACKGROUND OF THE INVENTION

Advancements in communication technologies have permitted the introduction, and popularization, of new types of communication systems. Mobile communication systems, such as cellular communication systems, are exemplary of communication systems which have been made possible as a result of advancements in communication technologies.

In a cellular communication system, telephonic communication, of both voice information and nonvoice information, is generally possible. In a cellular communication system, a subscriber, i.e., a user, to the system is able to communicate by way of a mobile station which is typically of a dimensional configuration permitting its carriage by the subscriber. The mobile station is typically constructed to be operable in manners which appear to the subscriber to be similar to those required to effectuate communications by way of a conventional telephonic station.

However, because a radio link is utilized upon which to define communication channels rather than utilization of a fixed, wireline connection, determination of the physical location at which a call is originated by the mobile station is not readily ascertainable.

The need to track the position of the mobile station is important, for instance, when a request for emergency assistance is made at the mobile station.

When a call is originated at a conventional wireline device, the geographical position from which the call is originated is easily ascertainable. A simple map between the telephonic identity of the originating, wireline device and the location at which the device is installed indicates the geographical positioning of the originating party. In contrast, due to the inherent mobility permitted of a mobile station, a subscriber of a mobile station is able to originate a call with the mobile station at almost any location within a geographical area encompassed by the cellular communication system. The geographical position at which the call is originated is, therefore, not easily determinable.

Determination of the location at which a call in which it is originated is of potentially vital importance to emergency assistance personnel when a request for emergency assistance is made through the mobile station. If a request for emergency assistance is made by way of a mobile station and the originating party is unable indicate the location from which the request for emergency is made, delivery of the emergency assistance might be delayed.

Proposals have been set forth by which to determine the positioning of a mobile station. Once determined, indications of the positioning of the mobile station are able to be used to identify to an emergency assistance center the position of the mobile station when a call is originated at the mobile station.

If additional information could also be automatically provided to the emergency dispatch, or other assistance, center, such information could further be used to better provide an appropriate response to a request for assistance.

For instance, digital image creation and transmission of signals representative of the created digital image is at least contemplated for proposed mobile systems. Such digital image creation is proposed, e.g., for video conferencing services to be effectuated through the use of mobile stations.

If a manner could be provided by which to provide to an emergency dispatch, or other assistance, center with a digital image taken at the calling location at which the originating party originates an emergency request, examination of the digital image would provide emergency personnel with additional information related to the request for emergency assistance. The digital image could be used, for instance, for evidentiary purposes.

It is in light of this background information related to mobile stations capable of creating digital images that the significant improvements of the present invention have evolved.

SUMMARY OF THE INVENTION

The present invention, accordingly, advantageously provides apparatus, and an associated method, by which to provide an assistance center, such as an emergency dispatch center in which an emergency call or other request for assistance is routed, with data generated at a mobile station at which the call is originated.

Through operation of an embodiment of the present invention, a manner is provided by which automatically to provide a digital image to the assistance center upon initiation at the mobile station of the assistance request. A single digital image can be provided. Or, a plurality of digital images, such as those generated pursuant to a multimedia transmission, can be provided.

In one aspect of the present invention, an originating party initiates a request for assistance by originating a call to an assistance center, such as an emergency dispatch center. The call is initiated by entering dialing digits associated with the assistance center. In the United States, for instance, many areas provide for "911" service in which a requestor of emergency assistance enters the dialing digits 9-1-1. Upon entering such emergency dialing digits, the call is routed to an appropriate emergency dispatch center. A dedicated actuation key is sometimes provided at the mobile station for emergency calls. Actuation of the dedicated actuation key at the mobile station causes entry of the dialing digits needed to establish a call with the emergency dispatch center.

In another aspect of present invention, positional indicia associated with the position at which the mobile station is located when the call is initiated at the mobile station is also provided to the assistance center. The positional indicia is determined either at the mobile station or at the network infrastructure of the radio communication system. Upon receipt of the positional indicia at the emergency dispatch, or other assistance, center, personnel at the center are able to determine the location from which the call requesting the assistance originated. Appropriate response to the request for assistance can be ordered to the location indicated by the positional indicia even in the absence of the originating party's ability to provide information related to the position at which the originating party places the call.

In another aspect of the present invention, a digital image is caused to be taken at the calling location upon user actuation Of the actuation key, or keys, which indicates the call to the assistance center. By providing the digital image to the assistance center, personnel at the assistance center are provided with additional information related to the calling location from which the call is originated. The digital image may, for instance, be used for evidentiary purposes to report the occurrence, or anticipation of occurrence of a crime, such as a crime anticipated to be perpetuated upon the originating party. By creating a digital image representive of the perpetuator, and then sending the digital image to the assistance center, the captured digital image is made available to identify the perpetrator.

In another aspect of the present invention, the digital image is captured upon user actuation of the actuation key. The call request is routed to the to assistance center to establish a call therewith. Upon establishment of the call to the assistance center, a digital image signal is communicated to the assistance center of values to permit recreation of the digital image at the assistance center. Positioning information associated with the position of the mobile station when the call is initiated is also provided to the assistance center.

In another aspect of the present invention, apparatus is provided for the assistance center to which a call is established by a mobile station requesting assistance. Upon establishment of the call with the mobile station, positional information associated with the mobile station together with a digital image taken at the mobile station from the location at which the call is initiated are both provided to the assistance center. The digital image is captured, and the positional information provided to the assistance center is indexed together with the captured digital image and stored at a storage device at the assistance center. Additional indicia, such as the time at which the call is established can also be indexed together with the digital image. By capturing the digital image, the image can later be retrieved and used for evidentiary purposes.

Thereby, through operation of an embodiment of the present invention, a digital image is provided to an assistance center by a mobile station. When the digital image is provided to the assistance center, personnel at the assistance center are better able to prepare an appropriate response to the request. And, by capturing the digital image at the assistance center, the digital image can be utilized for evidentiary purposes.

In these and other aspects, therefore, apparatus, and an associated method, is provided for a radio communication system having a mobile station selectably operable by a user to initiate a call at a calling position to an assistance center. A digital image is provided to the assistance center. A digital image creator is coupled at least to receive indications of initiation of the call to the assistance center. The digital image creator creates a digital image at the calling position at which the call is initiated responsive to reception of the indications of the initiation of the call. A digital image signal generator is coupled to receive indications of the digital image created by the digital image creator. The digital image signal generator generates a digital image signal for transmission to the assistance center together with the call initiated by the user to the assistance center.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE INVENTION

Figure 1:
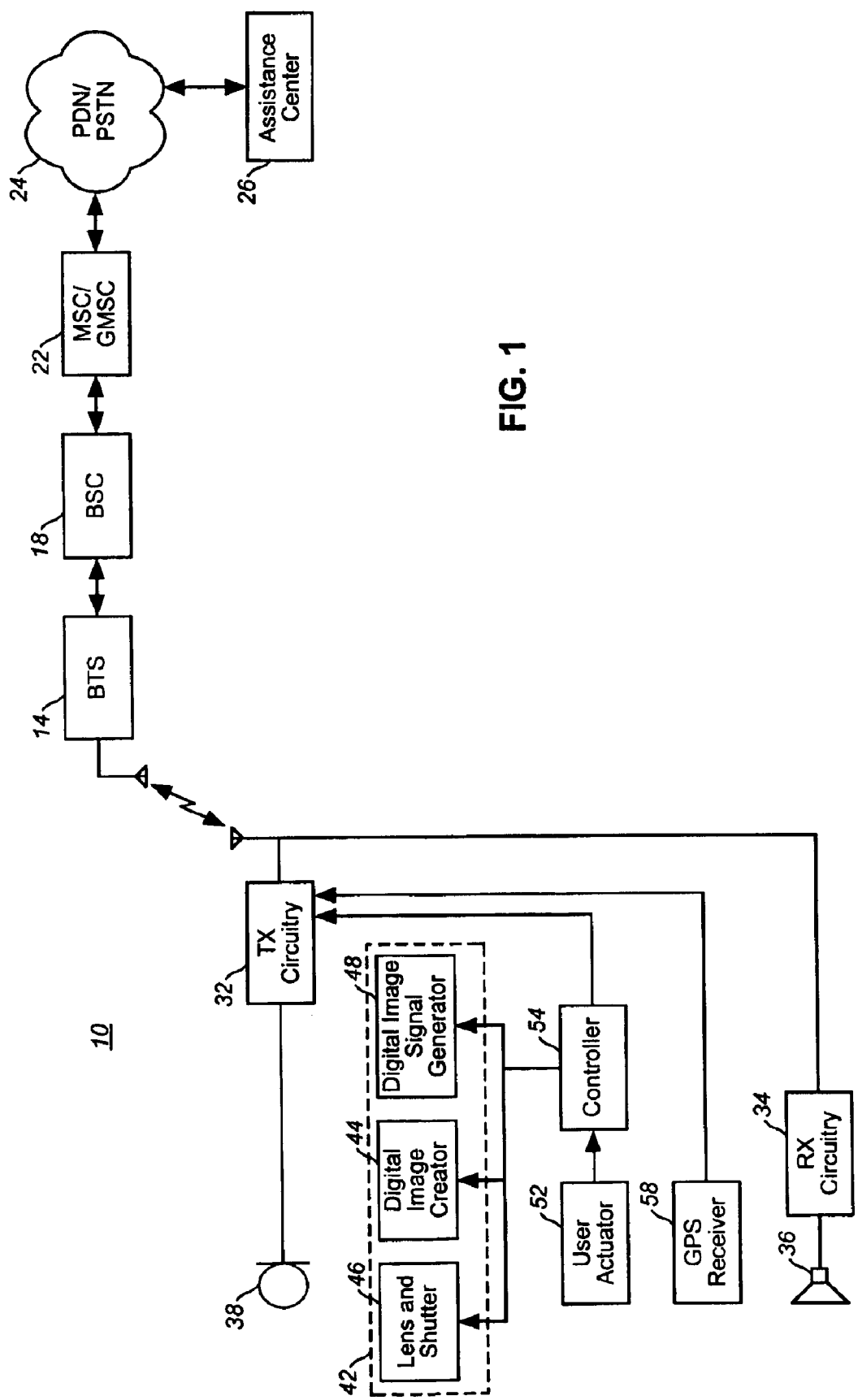
FIG. 1 illustrates a functional block diagram of a communication system in which an embodiment of the present invention is operable.

Referring first to FIG. 1, a radio communication system, shown generally at 10, is operable to provide radio communications with a mobile station 12. In the exemplary implementation shown in the figure, the radio communication system is formed of a digital cellular communication system constructed according to any of various standards promulgated by standard-creating bodies.

Operation of an embodiment of the present invention shall be described with respect to a digital cellular communication system. In other implementations, though, other embodiments of the present invention are analogously operable in other communication systems to provide assistance personnel at an assistance center with additional information in a request communicated thereto for assistance.

The digital cellular communication system, of which the radio communication system 10 is representative, includes a network infrastructure having a plurality of spaced-apart radio base transceiver stations, of which the base transceiver station (BTS) 14 is exemplary. The base transceiver stations are positioned at spaced intervals throughout a geographical area to be encompassed by the communication system.

The base transceiver station 14 is here shown to be coupled to a base station controller (BSC) 18. The base station controller is operable, amongst other things, to control operations of the base transceiver station. Typically, several base transceiver stations are coupled to a signal base station controller, and the base station controller controls the operation of each of the base transceiver stations coupled thereto. The base transceiver station is, in turn, coupled to a mobile switching center/gateway mobile switching center (MSC/GMSC) 22. The switching center 22 performs switching operations and is coupled to both a packet data network (PDN) and a public switched telephonic network (PSTN). The networks are together shown commonly represented as the network 24. Communication nodes are coupled the network 24. Here, a single node, a node formed at an assistance center 26, here an emergency dispatch center, is shown to be coupled to the network 24.

A communication path is formable between the assistance center 26 and the base transceiver station 14 and, in turn, by way of radio links 28 with the mobile station 12. Two-way communications are permitted to between the mobile station 12 and the communication node formed at the assistance center 26. A user of the mobile station, a "call originator", is able to originate a call to the assistance center. In many geographical areas, an emergency dialing code, e.g., 9-1-1 dialing in many parts of the United States, is entered by a user when request emergency assistance. The call request is routed to the emergency dispatch center, and a call is established between the calling station and the dispatch center. The originating party utilizing a mobile station 12 is able to place a call for emergency assistance by entering the dialing digits associated with the assistance center forming the emergency dispatch center.

The mobile station 12 includes both a transmit portion, represented by the transmit circuitry 32 and a receive portion, represented by the receive circuitry 34. The receive circuitry is operable to operate upon indications of receive signals transmitted to the mobile station on forward link channels of the radio link 28. And, the transmit circuitry 32 is operable to form transmit signals for communication by way of reverse link channels defined upon the radio link 28 to the base transceiver station 14.

The receive circuitry 34 is coupled to a data sink 36, here a microphone, at which the receive signals, subsequent to operations performed thereupon by the receive circuitry are transduced into acoustic form. And, the mobile station is also shown to include a data source 38 coupled to the transmit circuitry 32. The data source is here represented by a microphone operable to transduce acoustic signals into electrical form for application to the transmit circuitry.

The mobile station of an embodiment of the present invention further includes a digital camera capable of creating digital images. The digital cameral includes a digital image creator 44 coupled to a lens and shutter assembly 46. The lens and shutter assembly is operable in conventional manner to pass light energy to be detected by the digital image creator 44 at which a digital image is created. The digital image creator is coupled to a digital image formatter 46 and signal generator 48. The formatter and signal generator is operable to format a signal representative of the values forming the digital image created by the digital image creator and to provide the signal, once generated, to the transmit circuitry 32. The transmit circuitry is selectably operable to transmit the digital image signal generated by the signal generator 48. In one implementation, the digital image forms part of a multimedia sequence and the formatter 46 and the signal generator 48 are operable to provide a multimedia sequence to the transmit circuitry.

The mobile station also includes a user actuator 52, such as an actuation key actuable by a user of the mobile station. The user actuator, in the exemplary implementation, is formed of a key pad actuation key which, when actuated by the user of the mobile station, initiates a call to the assistance center 26 to request a call to the emergency dispatch center. Here, the user actuator 52 is shown to be coupled to the control circuitry 54. The control circuitry is operable to detect actuation of the user actuator and to generate the dialing digits associated with assistance center responsive to detection of the actuation of the user actuator. For instance, when the dialing digits associated with the assistance center are 9-1-1, actuation of the user actuator by a user a single time causes the control circuitry to generate the 911 digits which are the applied to the transmit circuitry 32. The transmit circuitry is operable pursuant to operation set forth in the standard specifications associated with the communication system pursuant to which the communication system 10 is constructed to commence call set-up procedures to generate a call request and to establish a call between the mobile station and the assistance center.

The mobile station also includes a GPS receiver 58. The GPS receiver is operable to receive satellite transmitted GPS (global positioning system) signals which are acted upon by the GPS receiver to determine the position at which the GPS receiver, and also the mobile station and the user thereof is located. Positional indicia, such as latitudinal and longitudinal coordinates, form the positional indicia and is provided to the transmit circuitry to by sent to the assistance center. Once received at the assistance center, the positional indicia is utilized to provide personnel at the assistance with indications of the position from which the call for assistance is originated.

During operation, when the user of the mobile station, i.e., the call originator is in need of assistance, the call originator actuates the user actuator 52. Actuation of the user actuator initiates placement of the call to the assistance center. Concurrent with the initiation of the call to the assistance center, the digital camera 42 is operable to create a digital image of a feature proximate to the mobile station and to provide a digital image signal representative thereof to the transmit circuitry 32. Positional indicia generated by the GPS receiver is also provided to the transmit circuitry to be communicated to the assistance center. Personnel at the assistance center are thereby automatically provided, upon call establishment between the mobile station and the assistance center, with both positional information related to the location from which the call is initiated as well as a digital image taken therefrom. Voice communications between the call originator and personnel at the assistance center are also effectuated. A single image can be provided to the assistance center, or a plurality of images can be provided together with the voice communications, thereby to provide a streaming video sequence, such as pursuant to a multimedia service, to the assistance center.

If the user of the mobile station is aware of a perpetuator preparing to perpetuate a crime against the user of the mobile station, the user of the mobile station actuates the user actuator and points the lens and shutter assembly 46 in the direction of the perpetuator to create a digital image of the perpetuator.

The digital image is automatically transmitted to the assistance center upon set-up of the call between the mobile station and the assistance center. As the digital image is automatically transmitted to the assistance center, the digital image of the perpetuator is remotely captured, to be used, if appropriate, for evidentiary purposes. Upon actuation of the user actuator, other types of emergency situations are similarly reportable to the assistance center together with a digital image thereof. By providing the digital image to the assistance center, the personnel of the assistance center are better able to provide an appropriate response to the request when provided with the digital image created at the mobile station.

Figure 2:
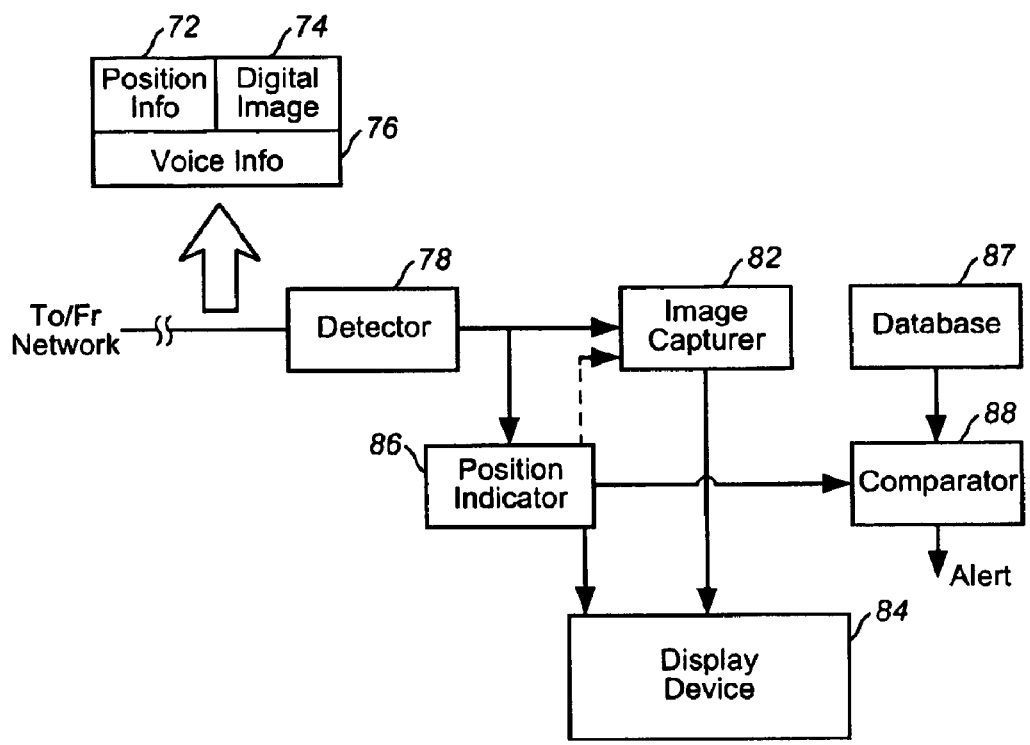
FIG. 2 illustrates a partial block, partial perspective view of a mobile station of an embodiment of the present invention.

FIG. 2 illustrates functional elements of the assistance center 26 which forms a node coupled to the network 24 (shown in FIG. 1) upon establishment upon a call connection between the mobile station and the assistance center, as described above, the assistance center is provided with both positional information, here indicated by the block 72 and a digital image, here indicated by the block 74 taken at the mobile station. Voice communications, here indicated by the block 76 are also effectuated between the mobile station and the assistance center.

A detector 78 is coupled to receive indications of at least the positional indicia and the digital image. When values of the digital image are detected, the values are provided to an image capturer 82. the image capturer is formed of a storage device which permanently stores the values of the digital image. The values of the digital captured and stored at the image capturer 82 are provided to a display device 84 to display the digital image to personnel at the assistance center.

The detector is also operable to detect the positional indicia sent to the assistance center and to provide such detected indicia to the position indicator 86. The position indicator is also coupled to the display device 84 to permit display of the positional indicia thereat. In one implementation, the positional indicia is overlayed upon the digital image captured by the image capturer and displayed upon the display device. By providing the display of the captured image and the positional indicia at the display device, personnel at the assistance center are better able to determine a most-appropriate response to the request for assistance.

In a further implementation, an automatic alert is sent out to emergency personnel, such as police personnel, positioned in an area proximate to the indicated position at which the request for assistance is initiated.

Here the assistance center further includes a database 87 containing updated positioning information associated with the locations at which the police, or other emergency assistance personnal, are positioned. A comparator 88 compares the position indicated by the position indicator 86 with the positions maintained at the database. Responsive to the comparisons, alerts are automatically sent out to the police or other emergency assistance personnel located in a selected proximity to the location at which the emergency request is initiated. The digital image can analogously also be sent out together with the alert. Alternately, the alerts are selected to be sent based upon profiles associated with the mobile stations, e.g., in manners described in PCT (Patent Convention Treaty) publication number WO 01/15480 A1, the contents of which are incorporated herein by reference. In such an implementation, the system probes for the closest mobile station to the originating party whose profile is associated with one or more security agents or other emergency assistance personnel.

Figure 3:
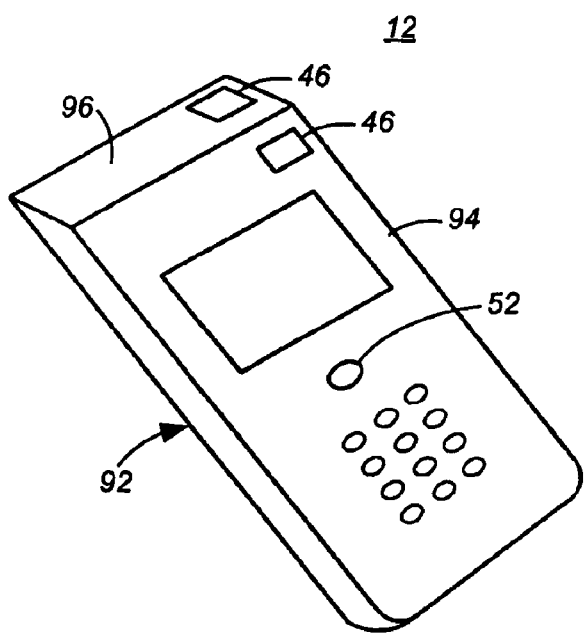
FIG. 3 illustrates a functional block diagram of an assistance center operable pursuant to an embodiment of the present invention.

FIG. 3 again illustrates the mobile station 12. Here, the transmit and receive circuitry of the mobile station is shown to be housed within a housing 92. The housing includes a front face surface 94 and a top face surface 96. Here, separate lens and shutter assemblies 46 are positioned at the front face and top face surfaces 94 and 96. And, the user actuator 52 is also shown to be positioned at the front face surface of the housing. Here, separate lens and shutter assemblies are utilized to permit a user of the mobile station to actuate the user actuator while causing the digital image to be created by way of the shutter and lens assembly 46 positioned at the top face surface 96 of the housing. The second lens and shutter assembly 46, positioned at the front face surface 94, is used for video conferencing by way of the mobile station. Upon creation of the digital image, and the digital image signal representative thereof, the digital image signal is transmitted to the assistance center to be used thereat.

Figure 4:
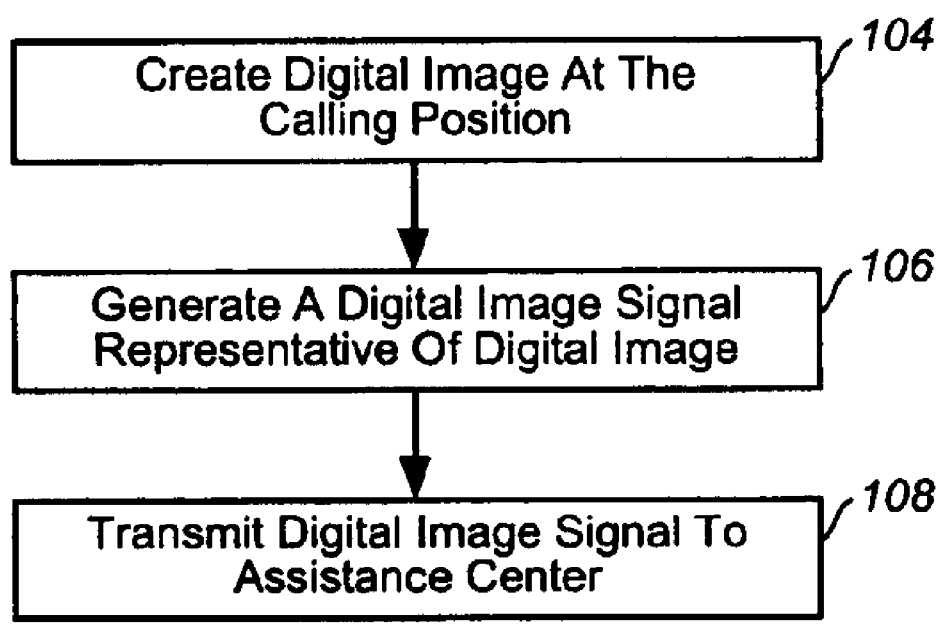
FIG. 4 illustrates a method flow diagram of the method of operation of an embodiment of the present invention.

FIG. 4 illustrates a method flow diagram, shown generally at 102, of an embodiment of the present invention. The method 102 provides a digital image to an assistance to which a user, positioned at a calling position of a mobile station selectably initiates a call.

First, and as indicated by the block 104, a digital image is created at the calling position from which the call is initiated responsive to initiation of the call.

Then, and as indicated by the block 106, a digital image signal representative of the digital image is generated. And, as indicated by the block 108, the digital image signal is transmitted to the assistance center. The digital image, once provided to the assistance center is displayed thereat.

Thereby, through operation of an embodiment of the present invention, a manner is provided by which to provide a digital image to an assistance center automatically together with initiation of a call to the assistance center from the mobile center.

The previous descriptions are of preferred examples for implementing the invention, and the scope of the invention should not necessarily be limited by this description. The scope of the present invention is defined by the following claims.

What is claimed is:

1. In a radio communication system having a mobile station having a transmit portion and a user actuator, the mobile station selectably operable by a user to initiate a call at a calling position to an assistance center, the user actuator actuable by the user to initiate the call to the assistance center, a combination with the mobile station of apparatus for providing a digital image to the assistance center, said apparatus comprising:

a digital image creator coupled at least to receive indications of initiation of the call to the assistance center and of actuation of the user actuator by the user, said digital image creator for creating a digital image at the calling position at which the call is initiated responsive to reception of the indications of the initiation of the call through the actuation of the user actuator;

a digital image signal generator coupled to receive indications of the digital image created by said digital image creator, said digital image signal generator automatically for generating a digital image signal for transmission to the assistance center together with the call initiated by the user to the assistance center upon creation of the digital image by said digital image creator, the digital image signal provided to the transmit portion to be transmitted therefrom.

2. The apparatus of claim 1 wherein the digital image generated by said digital image creator is created concurrent with initiation of the call to the assistance center, initiated responsive to actuation of the user actuator.

3. The apparatus of claim 1 wherein the mobile station further comprises a position indicator for indicating positional indicia associated with positioning of the mobile station and wherein indications of the positional indicia are generated for transmission to the assistance center together with the call initiated by the user to the assistance center.

4. The apparatus of claim 3 wherein the positional indicia indicated by the position indicator indicates the calling position at which the mobile station is located when the call to the assistance station is initiated.

5. The apparatus of claim 3 wherein, responsive to initiation of the call to the assistance center, the call is terminated thereat, thereby to effectuate a communication session between the mobile station and the assistance center, and wherein the digital image signal is sent by the mobile station to the assistance center, and wherein the digital image signal is sent by the mobile station upon effectuation of the communication session.

6. The apparatus of claim 5 wherein the indications of the positional indicia are sent by the mobile station to the assistance center upon effectuation of the communication session.

7. The apparatus of claim 1 wherein the assistance center comprises an emergency dispatch center, wherein the call is initiated to request emergency assistance and wherein said digital image signal generator generates the digital image signal for transmission to the emergency dispatch center.

8. The apparatus of claim 7 wherein the digital image created by said digital image creator comprises a digital image taken at the calling position during the call to request the emergency assistance.

9. In the radio communication system of claim 1, a combination with the assistance center of further apparatus for operating upon the digital image signal generated by said digital image signal generator, said further apparatus comprising:
   a detector coupled to receive indications of the digital image signal subsequent to transmission of the digital image signal to the assistance center, said detector for detecting values of the digital signal;
   an image capturer coupled to said detector, said image capturer for capturing a visual image responsive to the values of the digital image signal detected by said detector.

10. The further apparatus of claim 9 further comprising a display device coupled to said image capturer, said display device for displaying at the assistance center the visual image captured by said image capturer.

11. The further apparatus of claim 9 wherein said image capturer comprises a storage device at which the values of the digital image signal detected by said detector are stored.

12. The further apparatus of claim 11 wherein the mobile station is further operable to send positional indicia to the assistance center and wherein said detector is further operable to detect values of the positional indicia.

13. The apparatus of claim 12 wherein the storage device forming said image capturer further stores the values of the positional indicia.

14. The apparatus of claim 1 wherein the mobile station comprises a housing having a first side portion and a second side portion and wherein said digital image creator is at least alternately operable to create the digital image of the calling position beyond the first side portion of the mobile station and to create the digital image of the calling position beyond the second side portion of the mobile station.

15. A method for providing a digital image to an assistance center to which a user, positioned at a calling position, of a mobile station having a transmit portion and a user actuator, selectably initiates a call to the assistance center through actuation of the user actuator, said method comprising:
   creating a digital image at the calling position from which the call is initiated responsive to initiation of the call through actuation of the user actuator;
   automatically generating a digital image signal responsive to the digital image created during said operation of creating; and
   automatically transmitting, from the transmit portion, the digital image signal created during said operation of generating to the assistance center.

16. In a radio communication system having a mobile station having a transmit portion and a user actuator, the mobile station selectably operable by a user to initiate a call at a calling position to an assistance center, the user actuator actuable by the user to initiate the call to the assistance center a combination with the mobile station of apparatus for providing a multimedia sequence to the assistance center, said apparatus comprising:
   a digital image creator coupled at least to receive indications of initiation of the call to the assistance center and of actuation of the user actuator by the user, said multimedia sequence creator for creating a first digital image and at least a second digital image at the calling position at which the call is initiated responsive to reception of the indications of the initiation of the call through the actuation of the user actuator;
   a digital image signal generator coupled to receive indications of the first and at least second digital images, respectively, created by said digital image creator, said digital image signal generator for automatically generating first and at least second digital image signals for transmission to the assistance center together with the call initiated by the user to the assistance center.

* * * * *